Sept. 30, 1941.                D. L. McNEAL ET AL                2,257,308
                                BRAKE CONTROL MEANS
                    Filed Nov. 30, 1939            3 Sheets-Sheet 3

INVENTORS
DONALD L. McNEAL
JOHN CANETTA
BY
ATTORNEY

Patented Sept. 30, 1941

2,257,308

UNITED STATES PATENT OFFICE 2,257,308

BRAKE CONTROL MEANS

Donald L. McNeal and John Canetta, Wilkinsburg, Pa., assignors to The Westinghouse Air Brake Company, Wilmerding, Pa., a corporation of Pennsylvania Application November 30, 1939, Serial No. 306,878

19 Claims. (Cl. 303—21)

This invention relates to brake control means for vehicles, such as railway cars and trains, and has particular relation to brake control equipment in which the degree of application of the brakes is automatically reduced as the speed of the vehicle reduces as well as to brake control equipment in which the brakes are automatically released when a vehicle wheel or pair of wheels begins to slip to prevent sliding of the vehicle wheels.

Various types of equipment have been proposed for effecting automatically a reduction in the degree of application of the brakes as the speed of a vehicle reduces. Various types of apparatus have also been proposed for effecting a rapid reduction in the degree of application of the brakes when an individual wheel or pair of wheels begins to slip and thereafter effecting reapplication of the brakes when the slipping wheel accelerates back toward a speed corresponding to vehicle speed or after the slipping wheel has returned to a speed corresponding to vehicle speed. It has also been proposed to provide equipment including a combination of speed-controlled and slip-controlled apparatus.

It is an object of our invention to provide a novel brake control apparatus adapted to automatically reduce the degree of application of the brakes as the speed of the vehicle reduces and at the same time being adapted to effect automatically a rapid reduction in the degree of application of the brakes when a vehicle wheel or pair of wheels begins to slip so as to prevent sliding thereof.

The above object, and other more specific objects which will be made apparent hereinafter, are attained by means of several embodiments of our invention subsequently to be described and shown in the accompanying drawing, wherein.

Figure 1:
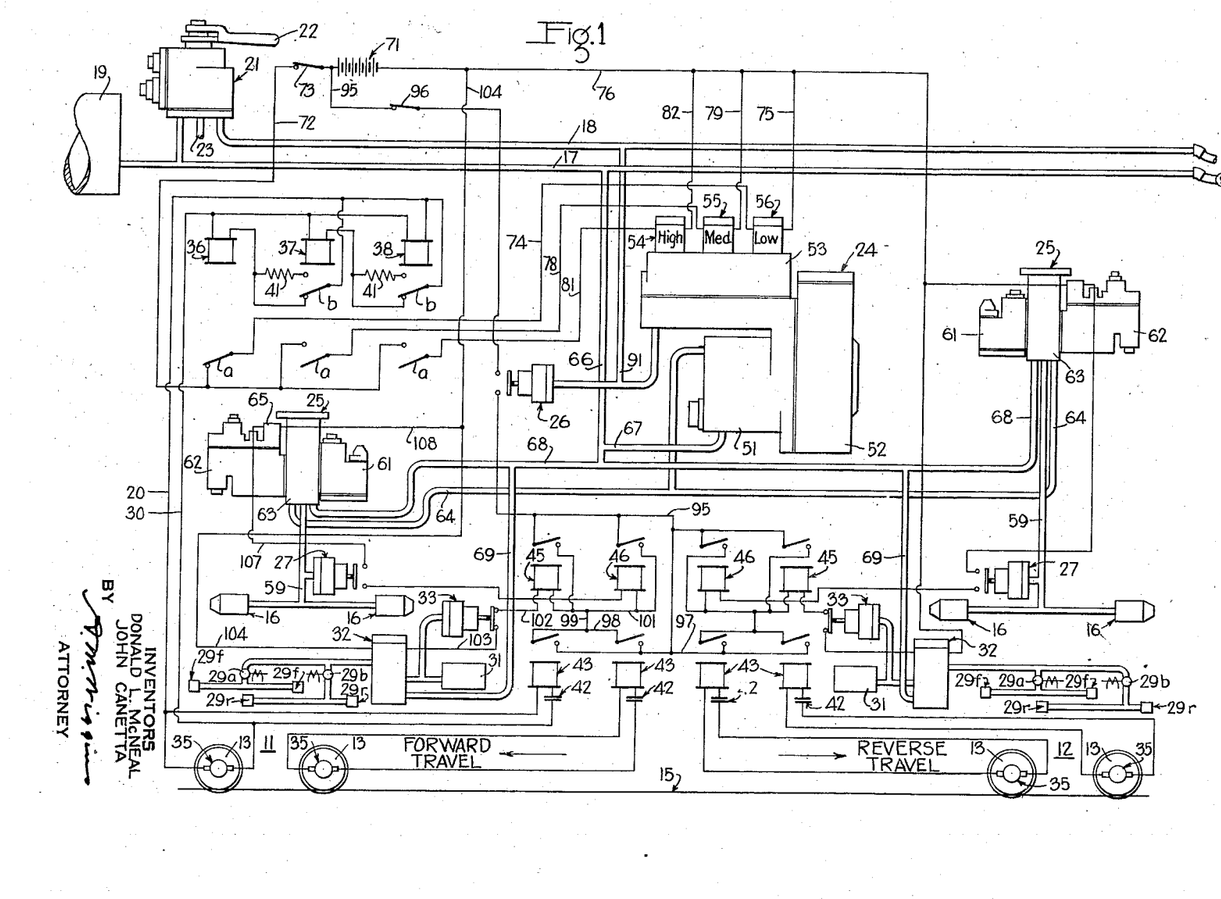
Fig. 1 is a simplified diagrammatic view, showing one embodiment of a brake control apparatus for a railway car.

*Description of embodiment shown in Fig. 1*

The brake control apparatus of Fig. 1 is illustrated as applied to a railway car having two four-wheel trucks, the one at the front end of the car being designated hereafter as the front wheel truck 11 and the one at the rear end being designated as rear wheel truck 12. It will be understood that each wheel truck has a leading and a trailing axle and that each axle has fixed to the opposite ends thereof a car wheel 13 which rolls on a corresponding rail of the track designated by the reference numeral 15. For simplicity, only one wheel is shown for each axle.

Conventional brake devices, such as brake shoes, are associated with each of the wheels 13 in manner not shown and operated by brake cylinders 16 through brake rigging also not shown. In Fig. 1, a brake cylinder 16 is provided for operating the brakes associated with the wheels of each axle but it will be understood that an individual brake cylinder may be provided for operating the brakes associated with each wheel or a single brake cylinder may be employed for applying the brakes associated with all the wheels of a wheel truck.

The apparatus for controlling the pressure in the brake cylinders 16 is illustratively shown as comprising two train pipes, referred to hereinafter as the supply pipe 17 and the control pipe 18, respectively, a reservoir 19 hereinafter referred to as the main reservoir and charged with fluid under pressure by a fluid compressor, not shown, a manually operated brake valve device 21 of the self-lapping type for controlling the pressure in the control pipe 18, a speed-controlled valve mechanism 24, a slip-controlled valve mechanism 25, a pressure-operated switch 26 controlled according to the pressure in the control pipe 18, and a pressure-operated switch 27 for each wheel truck adapted to be controlled according to the pressure in the corresponding brake cylinders.

The apparatus further includes a plurality of sanding devices 29f and 29r of conventional type. Two sanding devices 29f are provided for each wheel truck 11 and 12 for causing deposition of sand in advance of the vehicle wheels 13, upon the supply of fluid under pressure thereto, when the car is traveling in a forward direction. Similarly, two sanding devices 29r are provided for each wheel truck for causing deposition of sand in advance of the vehicle wheels 13 when the car travels in the reverse direction.

Fluid under pressure is supplied to the sanding devices 29f and 29r from a corresponding sanding reservoir 31 for each wheel truck under the control of a magnet valve device 32 of the double beat type. The magnet valve device 32 is effective when deenergized to establish a communication through which the sanding reservoir 31 is charged with fluid under pressure from the supply pipe 17 and is effective when energized to close the charging communication and open the communication through which fluid under pressure is supplied from the reservoir 31 to the sanding devices to effect sanding.

Figures 2, 3:
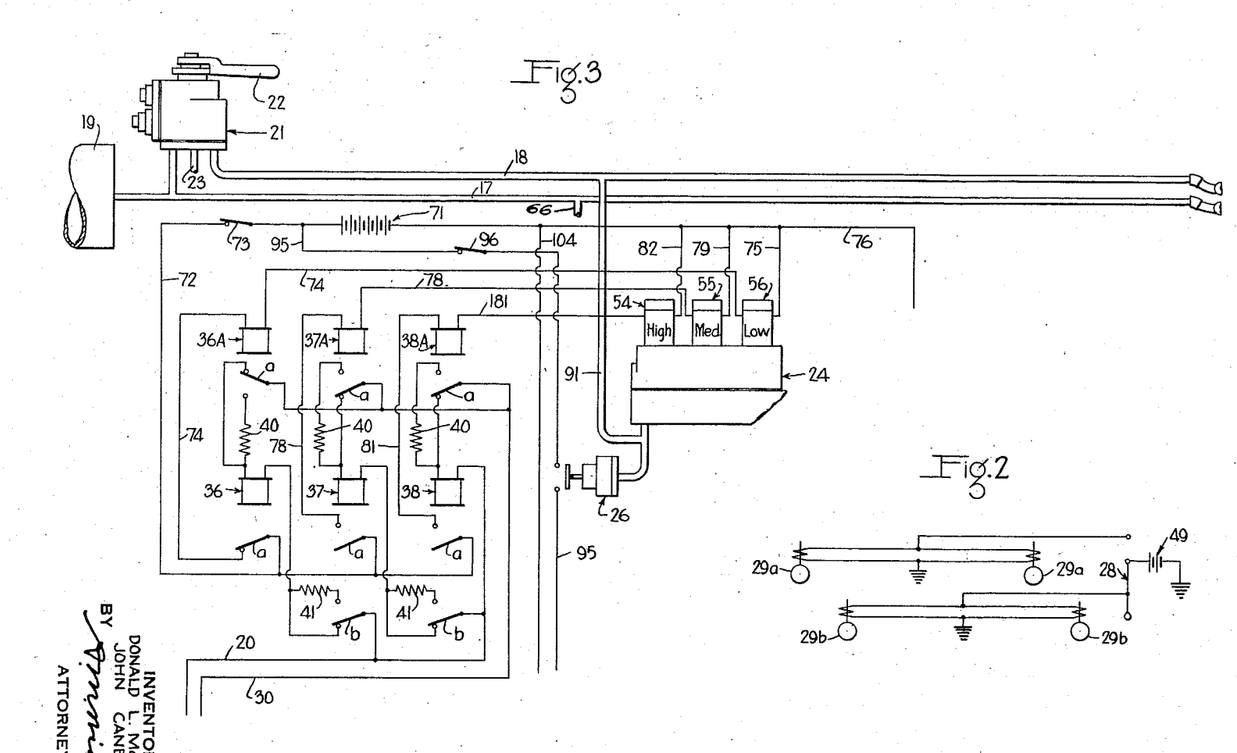
Fig. 2 is a simplified wiring diagram, showing the manner in which the sanding operation in the apparatus of Fig. 1 may be controlled in accordance with the direction of travel by the car.
Fig. 3 is a fragmental diagrammatic view, showing a modification of the apparatus shown in Fig. 1.

The supply of fluid under pressure to the sanding devices 29f for each wheel truck is also controlled by a valve 29a of the solenoid-operated type which is interposed between the magnet valve 32 and the sanding devices. Similarly, the supply of fluid under pressure to the sanding devices 29r of each wheel truck is controlled by a solenoid operated valve 29b which is interposed between the magnet valve 32 and the sanding devices. As shown in Fig. 2, the solenoid windings of the valves 29a for the two wheel trucks are connected in parallel relation and the solenoid windings of the valves 29b for both wheel trucks are connected in parallel relation. The solenoid windings for valves 29a and 29b are alternatively energized or deenergized under the control of a suitable switch 28, either manual or automatic in character, of the single-pole double throw type by current supplied from a suitable battery 49.

The solenoid-operated valves are adapted to be open when the solenoid windings thereof is deenergized and closed when the solenoid winding is energized. Thus, when the car is traveling in a forward direction, the blade of the switch 28 is thrown to its lower position, as shown, to effect energization of only the solenoid windings of the valves 29b and consequent closure thereof. Accordingly, when the magnet valve 32 is energized, fluid under pressure is supplied only to the sanding devices 29f through the open valves 29a. Conversely, when the car is traveling in a reverse direction, the blade of the switch 28 is thrown to its upper position thereby causing energization of only the solenoid windings of the valves 29a and the consequent closure thereof. In such case, when magnet valve 32 is energized, fluid under pressure is supplied only to the sanding devices 29r.

Associated with each sanding reservoir is a pressure-operated switch 33 which controls the energizing circuit of the corresponding magnet valve device 32. Each pressure-operated switch 33 is adapted to open when the pressure in the corresponding sanding reservoir 31 reduces, by exhaust through the sanding devices 29f or 29r, below a certain low pressure.

The apparatus further includes a generator 35, of the direct-current type, for each axle of each wheel truck, each generator being arranged to be driven according to the speed of rotation of the corresponding axle as, for example, by being mounted in the journal housing at one end of the axle, with the armature shaft of the generator coupled to the end of the axle.

The generators 35 are so designed as to produce a direct-current voltage at the brush terminals thereof which is substantially proportional to the speed of rotation of the corresponding axle and wheel fixed thereto and which is of opposite polarity for opposite directions of rotation of the corresponding wheels. Accordingly, as long as the wheels on the leading axle of the front wheel truck do not slip, the voltage at the brush terminals of the corresponding generator 35 is substantially proportional to the speed of travel of the car.

Connected in parallel relation to each other by means of two wires 20 and 30, across the brush terminals of the generator 35 associated with the leading axle of the front wheel truck 11 are three voltage-responsive relays 36, 37 and 38, respectively. These three relays are designed to pick-up and drop-out at different voltages corresponding to different speeds of travel of the car. Thus, the relay 36 is adapted to operatively respond or pick-up only at a voltage exceeding that corresponding substantially to a 20 mile per hour speed of travel of the car, relay 37 is adapted to pick-up only at a voltage exceeding that corresponding to a 40 mile per hour speed of travel of the car, and relay 38 is adapted to pick-up only at a voltage exceeding that corresponding to a 65 mile per hour speed of travel of the car.

The relay 36 has a single back-contact member $a$ which is in closed position when the relay is not picked-up and which is operated to open position when the relay is picked-up. Each of the relays 37 and 38 has two contact members $a$ and $b$ respectively. The contact member $a$ of each of the relays 37 and 38 is a front-contact member which is in open position when the relay is not picked-up and which is operated to a closed position when the relay is picked-up. The contact member $b$ of each of the relays 37 and 38 of the double-contact type and occupies a lower closed position when the relay is dropped-out and an upper closed position when the relay is picked-up.

As will be seen in the drawings, one terminal of the operating coil of relay 36 is connected to the wire 30 while the other is connected to the wire 20 under the control of the contact member $b$ of relay 37. In a similar manner, one terminal of the operating coil of relay 37 is connected to the wire 30 whereas the other terminal of the operating coil is connected to the wire 20 under the control of the contact member $b$ of the relay 38. The terminals of the operating coil of the relay 38 are connected directly across the two wires 20 and 30.

The contact member $b$ of the relay 37 is effective, in its upper closed position, to include a current-limiting device, such as a resistor 41, between the one terminal of the operating coil of relay 36 and the wire 20. In a similar manner the contact member $b$ of relay 38 is effective, in its upper closed position, to include a similar resistor 41 between the one terminal of the operating coil of relay 37 and the wire 20. In the lower closed positions thereof, the contact members $b$ of the relays 37 and 38 connect the one terminal of relay 36 and relay 37 respectively directly to wire 30, thus cutting the resistors 41 out of the circuit.

It will thus be seen that when the relay 37 is picked-up, a resistor 41 limits the current through the operating coil of relay 36. In a similar manner, when the relay 38 is picked-up, the corresponding resistor 41 limits the current through the operating coil of the relay 37. The purpose of the resistors 41 is to prevent the burning-out of the operating coils of relays 36 and 37 when the voltage across the brush terminals of the generator 35 reaches the high values occurring at high speeds in excess of 65 M. P. H. The coil of relay 38 does not require such protection because it is designed to withstand such high voltages.

The contact members a of the relays 36, 37 and 38 are effective, in the manner subsequently to be described to control the speed-controlled valve mechanism 24.

It should be understood that the relays 36, 37 and 38 are of the neutral type and are operative whenever the impressed voltage exceeds the predetermined pick-up voltage regardless of its polarity and, therefore, of the direction of travel of the car.

Each of the generators 35, including the generator 35 associated with the leading axle of the front wheel truck 11, has connected across the brush terminals thereof, in series relation, an electrical condenser 42 and a current-responsive relay 43. The relays 43 are of the neutral type, adapted to pick-up whenever the current flowing through the operating coil thereof exceeds a certain value, regardless of the direction of flow of current and consequently the direction of travel of the car. The arrangement of the condenser 42 and current-responsive relay 43 in each generator circuit is such as to cause a flow of current in the circuit proportional to the rate of change of voltage at the brush terminals of the generator and consequently to the rate of acceleration or deceleration of the corresponding vehicle wheels. It will be observed that upon acceleration of the car, the voltage at the brush terminals of each generator increases at a corresponding rate to effect charging of the electrical condenser, the current flow in the circuit being proportional to the rate of increase of voltage at the brush terminals of the generator. Conversely, when the car wheels decelerate and the voltage at the brush terminals of the generator reduces at a corresponding rate, the current discharged from the condenser 42 is substantially proportional to the rate of reduction of voltage at the brush terminals of the generator. It should be understood that the arrangement of the relay 43 and condenser 42 to measure the rate of change of rotative speed of the vehicle wheel is not, per se, our invention.

The current-responsive relays 43 are so designed as to pick-up only in response to a current exceeding a certain value and corresponding to a certain rate of deceleration or acceleration of the vehicle wheels, such as ten miles per hour per second.

It is well known that such a high rate of deceleration of the vehicle wheel is not attained unless the vehicle wheels slip. The term "slip," as employed herein, designates the rotation of a vehicle wheel at a speed less than a speed corresponding to vehicle speed and resulting from application of the brakes to a degree sufficient to exceed the adhesion between the wheel and the rail. Once a vehicle wheel starts to slip it decelerates rapidly at a rate exceeding ten miles per hour per second to a locked-wheel condition. The term "slide," as employed herein, designates the dragging of the vehicle wheel along a road surface or rail in a locked condition, as distinguished from the term "slip" which refers to a rotative condition of the vehicle wheel.

The current-responsive relays 43 are accordingly not picked-up unless the vehicle wheels associated with the corresponding generator 35 begin to slip.

Each of the relays 43 has a single front-contact member which is open when the relay is not picked-up and which is operated to a closed position when the relay is picked-up.

The contact members of the relays 43 corresponding to the axles of the front wheel truck 11 are connected in parallel relation in such a manner that either of the two relays is effective when picked-up during an application of the brakes to effect energization of a sand relay 45 and a brake relay 46.

In a similar manner, the contact members of the current-responsive relays 43 for the axles of the rear wheel truck 12 are connected in parallel relation in such manner that either is effective when picked-up during an application of the brakes to effect energization of a similar sand relay 45 and brake relay 46 for the rear wheel truck.

The relays 45 and 46 are of the neutral type, each having a single front-contact member which is actuated from an open to a closed position when the relay coil is energized. As will be made apparent hereinafter, the contact members of the relays 45 and 46 are self-holding contact members; that is, they are effective once actuated to closed position to continue to establish a holding circuit for maintaining the operating coil of its relay energized thereafter independently of the relays 43.

The sand relay 45 for each wheel truck is effective when picked-up to cause energization of the corresponding sanding magnet valve device 32. The brake relay 46 for each wheel truck is effective when picked-up to cause operation of the slip-controlled valve mechanism 25 to cause a rapid release of the brakes on the corresponding truck.

Before describing the operation of the equipment, a brief description of the brake valve device 21, the speed-controlled valve mechanism 24, and the slip-controlled valve mechanism 25 will be given.

The brake valve device 21 is of the type described and claimed in Patent 2,042,112 of Ewing K. Lynn and Rankin J. Bush. Briefly, it comprises an operating handle 22 for operatively moving a rotary operating shaft of a self-lapping valve mechanism. In the normal release position of the brake valve handle 22, the self-lapping valve mechanism of the brake valve device is conditioned to vent the control pipe 18 to atmosphere through the exhaust port 23 thereof. When the brake valve handle is shifted out of its release position into a zone, referred to as the application zone, the self-lapping valve mechanism is operative to supply fluid under pressure to the control pipe 18 from the supply pipe 17. Supply pipe 17 is constantly connected to main reservoir 19 and charged to the pressure therein. The self-lapping valve mechanism is so designed as to establish a pressure in the control pipe 18 corresponding to the degree of displacement of the brake valve handle 22 out of its release position. Thus, if the pressure in the control pipe tends to reduce for some reason, such as leakage, the self-lapping valve mechanism is automatically effective to maintain a pressure in the control pipe corresponding to the position of the brake valve handle.

It will be understood that the pressure in control pipe 18 may be controlled by any suitable apparatus and that it is not our intention to limit the control of the pressure in the pipe 18 to a self-lapping brake valve of the type described.

The speed-controlled valve mechanism 24 is of the type described and claimed in Patent 2,140,624 of E. E. Hewitt. Briefly it comprises a self-lapping relay valve section 51, a diaphragm section 52 comprising a plurality of coaxially spaced movable abutments or diaphragms of different effective pressure areas respectively, and a magnet valve section 53 including a so-called high magnet valve 54, a medium magnet valve 55 and a low magnet valve 56.

The magnet valves 54, 55 and 56 respectively control the supply of fluid under pressure to and the release of fluid under pressure from a corresponding one of the chambers formed in the diaphragm section 52 between successive diaphragms and thus due to the difference in area of the diaphragm control the operating pressure or force actuating the self-lapping relay valve mechanism in the valve section 51 so that the relay valve mechanism correspondingly supplies fluid at different pressures through a pipe 64 to the slip-controlled valve mechanism 25 for each wheel truck pressure. The fluid under pressure supplied to the chambers between the diaphragms of the valve mechanism 24 under the control of the magnet valve 54 and 55 and 56 is from a branch pipe 91 of the control pipe 18, so that the pressure of the fluid supplied to the valve mechanisms 25 also varies in proportion to the pressure established in the control pipe.

The arrangement of the magnet valves 54, 55 and 56 is such that when the low magnet valve 56 only is energized, the pressure from the control pipe 18 is effective on the smallest diaphragm only and accordingly the pressure supplied by the relay valve mechanism in section 51 of the valve mechanism 24 bears a minimum ratio to the pressure established in the control pipe 18.

When all of the magnet valve devices 54, 55 and 56 are deenergized, fluid under pressure is supplied from the control pipe 18 to act on the smallest diaphragm and the next larger diaphragm so that the relay valve mechanism in section 51 of the valve mechanism 24 correspondingly operates to deliver a higher pressure for the same control pipe pressure.

When only the medium magnet valve device 55 is energized, fluid under pressure is supplied from the control pipe 18 to then act on the smallest diaphragm and the next two larger diaphragms so that the relay valve mechanism in section 51 of the valve mechanism 24 correspondingly operates to supply fluid at a still higher pressure for a given control pipe pressure.

When the high magnet valve 54 and the medium magnet valve 55 are energized and the low magnet valve 56 is deenergized, fluid under pressure is supplied from the control pipe 18 to act on all of the diaphragms including those previously mentioned and an additional larger diaphragm so that fluid at an even higher pressure is supplied by the relay valve mechanism of the valve mechanism 24.

It will be apparent that depending upon the ratio between the areas of the successive diaphragms of the valve mechanism 24, the ratio between the pressure delivered by the relay valve mechanism of valve mechanism 24 and that established in the control pipe 18 will correspondingly vary. For illustrative purposes it will be assumed that when the low magnet valve 56 only is energized, the pressure of the fluid delivered by the valve mechanism 24 to the slip controlled valve mechanisms 25 is one-third of that established in the control pipe. It will be further assumed that when all the magnet valve devices 54, 55, and 56 are deenergized, the pressure of the fluid delivered to the slip-controlled valve mechanisms 25 is one-half of the pressure established in the control pipe. When only the medium magnet valve 55 is energized, it is assumed that the pressure of the fluid delivered to the slip-controlled valve mechanisms 25 is three-fourths of the pressure established in the control pipe. When the high magnet valve 54 and the medium magnet valve 55 are both energized while the low magnet valve 56 is deenergized, the pressure delivered to the slip-controlled valve mechanisms 25 by the valve mechanism 24 is assumed to be substantially equal to the pressure established in the control pipe.

The slip-controlled valve mechanism 25 for each wheel truck is of the type described in detail and claimed in Patent 2,218,619 to Donald L. McNeal, one of the present joint applicants. Since reference may be had to the patent just mentioned for details of construction of the valve mechanism 25, a brief functional description only is given herein.

Each valve mechanism 25 comprises a relay valve portion 61 and a magnet valve portion 62 secured to opposite faces respectively of an intermediate pipe bracket section 63. The relay valve portion 61 comprises a self-lapping valve mechanism which has an operating piston that is subject on one face thereof to the pressure of fluid delivered from the speed-controlled valve mechanism 24. The relay valve portion of each of the valve mechanisms 25 is operative according to the pressure delivered to the operating piston thereof for supplying fluid at a corresponding pressure to the brake cylinders 16 associated therewith.

The magnet valve portion 62 of each valve mechanism 25 includes a magnet valve device 65. The magnet valve device 65 is effective, when deenergized, to permit the flow of fluid under pressure from the supply pipe 64 to the operating piston of the relay valve portion 61 and, when energized, to cut off such supply and to rapidly release fluid under pressure from the operating piston of the relay valve portion so that the relay valve portion effects a corresponding reduction in the fluid pressure in the brake cylinders 16.

In addition, the magnet valve portion 62 includes valve mechanism which is effective, once the magnet valve device 65 is energized, to cause the rate of flow of fluid under pressure from the pipe 64 to the operating piston of the relay valve portion 61 to be restricted to a rate lower than the normal rate, as long as the pressure in the pipe 64 exceeds a certain low pressure such as five pounds per square inch.

It will be further noted that the source of fluid under pressure for the speed-controlled valve mechanism 24, the slip-controlled valve mechanism 25 and the sanding reservoir 31 is the supply pipe 17. The relay valve portion 51 of the speed-controlled valve mechanism 24 is connected to the supply pipe 17 by a pipe 66 and a branch pipe 67. A second branch 68 of the pipe 66 leads to the pipe bracket section 63 of the slip-controlled valve mechanisms 25 for both wheel trucks. Also, two branch pipes 69 of the pipe 68 lead respectively to the two sanding magnet valves 32 which in turn respectively control the supply of fluid under pressure to the sanding reservoirs 31.

Operation of equipment shown in Fig. 1

Let it be assumed that the main reservoir 19 is charged to the normal pressure carried therein, for example, 100 pounds per square inch, and that the supply pipe 17 and sanding reservoirs 31 are thus correspondingly charged with fluid under pressure. With the sanding reservoirs thus charged, the corresponding pressure switches 33 are each in their closed position as shown.

Let it be further assumed that the car is at a standstill and that the brake valve handle 22 is in its release position so that the control pipe 18 is correspondingly at atmospheric pressure. As will be seen hereinafter, fluid under pressure is accordingly exhausted from the brake cylinders 16 so that the brakes are released. At the same time the pressure-operated switches 26 and 27 are in open position as shown.

Since the car is at a standstill, the generator 35 associated with the leading axle of the front wheel truck 11 is not producing a voltage and therefore no voltage is impressed on the wires 20 and 30. The voltage-responsive relays 36, 37, and 38 are, therefore, all dropped-out. In its dropped-out position, the back-contact member $a$ of the relay 36 establishes a circuit for energizing the magnet winding of the low magnet valve 56 of the speed-controlled valve mechanism 24. This circuit extends from one terminal, such as the positive terminal, of a suitable battery 71, by way of a wire 72 including a manually operated knife switch 73, contact member $a$ of the relay 36, a wire 74, the magnet winding of the low magnet valve 56, and wires 75 and 76 back to the negative terminal of the battery 71.

The front-contact members $a$ of the two relays 37 and 38 are each in open position and the high and medium magnet valves 54 and 55 are thus deenergized.

It will thus be seen that the speed-controlled valve mechanism 24 is conditioned so that upon the charging of the control pipe 18, the pressure delivered by valve mechanism 24 through the pipe 64 to the operating piston of the relay valve portion 61 of each slip-controlled valve mechanism 25 bears a minimum ratio to the pressure established in the control pipe. As previously assumed, the pressure established in the pipe 64 under the assumed condition will be one-third of the pressure established in the control pipe.

Let it now be assumed that with the brake valve handle 22 remaining in its release position, the operator operates a suitable power controller, not shown, to start the car in the forward direction, indicated by the arrow as movement in the left-hand direction. Let it also be assumed that the operator has previously shifted the blade of switch 28 to the position shown in Fig. 2 so that the solenoid valves 29b are closed and the solenoid valves 29a are open. As the speed of the car increases, the voltage at the brush terminals of the generator 35 associated with each axle correspondingly increases. When the voltage at the brush terminals of the generator 35 associated with the leading axle of the front wheel truck exceeds a value corresponding to a speed of 20 M. P. H. travel of the car, the relay 36 is picked-up. The contact member $a$ of the relay 36 is accordingly actuated to its open position. The magnet winding of the low magget valve 56 of the speed-controlled valve mechanism 24 is accordingly deenergized by interruption of its energizing circuit.

When the speed of travel of the car increases above 40 M. P. H. the corresponding voltage at the brush terminals of the generator 35 for the leading axle of the front wheel truck causes the relay 37 to be picked-up. The front-contact member $a$ of the relay 37 is accordingly actuated to its closed position and thereby establishes a circuit for energizing the magnet winding of the medium magnet valve 55 of the speed-controlled valve mechanism 24. This circuit extends from the positive terminal of the battery 71 through the wire 72 including the switch 73, contact member $a$ of the relay 37, a wire 78, the magnet winding of the medium magnet valve 55, a wire 79, and wire 76 back to the negative terminal of the battery 71.

The contact member $b$ of the relay 37 is effective in its picked-up position to insert the resistor 41 in series with the operating coil of the relay 36 across the wires 20 and 30 for the purpose previously explained. The current energizing relay 36 is thus reduced but not enough to cause relay 36 to drop-out.

Let it be assumed that the speed of the car increases further to a speed in excess of 65 M. P. H. In such case the voltage at the brush terminals of generator 35 associated with the leading axle of the front-wheel truck 11 causes relay 38 to be picked-up. The contact member $a$ of the relay 38 is effective in its picked-up position to establish a circuit for energizing the magnet winding of the high magnet valve 54 of the valve mechanism 24. This circuit extends from the positive terminal of the battery 71 by way of the wire 72 including the switch 73, contact member $a$ of the relay 38, a wire 81, the magnet winding of the high magnet valve 54, a wire 82, and wire 76 back to the negative terminal of the battery 71.

The contact member $b$ of relay 38 is effective in its picked-up position to insert the resistor 41 in series with the operating coil of relay 37 across the wires 20 and 30 for the purpose previously explained. The current-energizing relay 37 is thus reduced but not enough to cause relay 37 to drop-out.

It will be thus seen that the magnet valves 54, 55, and 56 of the valve mechanism 24 are selectively energized or deenergized in different combinations depending upon the speed of travel of the car.

Now let it be assumed that while the car is traveling at a speed in excess of 65 M. P. H. the operator desires to effect an application of the brakes. To do so the operator shuts off the propulsion power, if the power is on, and shifts the brake valve handle 22 out of its normal release position to a position corresponding to the desired degree of application of the brakes. The control pipe 18 is accordingly charged to a pressure for example, such as 60 pounds per square inch. Fluid under pressure is accordingly supplied from the control pipe 18 by way of branch pipe 91 to the chambers associated with all of the diaphragms of the speed-controlled valve mechanism 24 due to the fact that the magnet valves 54 and 55 are energized and the magnet 56 is deenergized. The relay valve portion 51 of the valve mechanism 24 is accordingly operated to supply fluid, at a pressure substantially equal to the pressure established in the control pipe, to the pipe 64 leading to the operating piston chamber of the relay valve portion 61 of the slip-controlled valve mechanism 25 for each wheel truck.

The relay valve portion 61 of the valve mechanism 25 for each wheel truck is accordingly operated to supply fluid under pressure from the supply pipe 68 to the brake cylinders 16 to establish a pressure therein substantially equal to the pressure established in the control pipe 18. The car is accordingly decelerated in response to the application of the brakes and the speed of the car, therefore, correspondingly reduces.

As is well known, it is an inherent characteristic of conventional relays that the contact members thereof do not drop-out in response to a decrease of impressed voltage or energizing current at the same value of impressed voltage or energizing current that caused the relay contact members to be picked-up because of the fact that, once the armature of the relay is picked-up, the air gap between the armature and the magnetic core is reduced. Thus, the voltage responsive relay 38 does not drop-out immediately upon the reduction of the car speed below 65 M. P. H. but drops out at some value slightly below 65 M.P. H. such as 60 M. P. H. When the speed of travel of the car is reduced sufficiently to cause the relay 38 to drop-out, the contact member $a$ of relay 38 is returned to open position to interrupt the energizing circuit of the magnet winding of the magnet valve 54 and the contact member $b$ of the relay 38 cuts the resistor 41 out of the circuit of the operating coil of the relay 37.

With only the medium magnet valve 55 of the valve mechanism 24 energized, the relay valve portion 51 of the valve mechanism 24 is operated to effect a reduction of the pressure in the pipe 64 leading to the slip-controlled valve mechanisms 25 without any reduction of the pressure in the control pipe 18. As previously explained, the pressure established in the pipe 64 with only the magnet valve 55 of the valve mechanism 24 energized is three-fourths of the pressure established in the control pipe 18. Accordingly, assuming 60 pounds per square inch pressure to be maintained in the control pipe 18, it will be seen that upon the drop-out of the relay 38, the pressure of the fluid supplied to the relay valve portion 61 of the control valve mechanisms 25 is reduced to 45 pounds per square inch.

Upon such reduction of the fluid pressure operating the relay valve portion 61 of each valve mechanism 25, the relay valve portion 61 operates to reduce the pressure in the brake cylinders to 45 pounds per square inch, thereby correspondingly decreasing the degree of application of the brakes.

When the speed of the car reduces sufficiently to cause drop-out of the relay 37, and such drop-out occurs when the speed reduces somewhat below 40 M. P. H., the contact members $a$ and $b$ of the relay 37 are returned to their dropped-out positions respectively interrupting the energizing circuit for the medium magnet valve 55 and cutting-out the resistor 41 from the circuit of the operating coil of the relay 36.

With all of the magnet valves 54, 55, and 56 of the valve mechanism 24 now deenergized, the relay valve portion 51 of the valve mechanism 24 is operated to further reduce the pressure in the pipe 64 to a value which is one-half the pressure established in the control pipe 18. Assuming a pressure of 60 pounds per square inch to be maintained in the control pipe, the pressure in the pipe 64 is accordingly reduced to 30 pounds per square inch. The relay valve portion 61 of the valve mechanism 25 for each wheel truck is accordingly operated to effect a corresponding reduction of pressure in the brake cylinder to 30 pounds per square inch, thereby further decreasing the degree of application of the brakes.

As the speed of travel of the car further reduces, due to the application of the brakes, to a value somewhat below 20 M. P. H., the relay 36 is dropped-out. Contact member $a$ of the relay 36 is accordingly effective in its dropped-out position to establish the circuit for energizing the magnet winding of the magnet valve 56. The relay valve portion 51 of the valve mechanism 24 is accordingly operated to reduce the pressure in the pipe 64 to one-third of the pressure established in the control pipe 18. Assuming the pressure of 60 pounds per square inch to be maintained in the control pipe 18, the pressure in the pipe 64 is accordingly reduced to 20 pounds per square inch. The relay valve portion 61 of the valve mechanism 25 for each wheel truck is accordingly operated to reduce the pressure in the brake cylinders 16 to 20 pounds per square inch.

As the speed of the car further reduces and the car approaches a stop, the degree of application corresponding to the last described condition of the valve mechanism 24 remains in effect. It will be apparent, however, that if in accordance with the usual manner of operation, the operator shifts the brake valve handle 22 back toward the release position to reduce the pressure in the control pipe 18 as the car approaches a stop, the pressure in the brake cylinders is likewise correspondingly reduced. The ratio between the pressure in the brake cylinders and the pressure established in the control pipe 18 is, however, at all times dependent upon the condition of the valve mechanism 24 as determined by energization or deenergization of the magnet valves 54, 55 and 56.

The automatic reduction in the degree of application of the brakes in response to the reduction in the speed of travel of the car is adapted under normal conditions to prevent such excessive application of the brakes as will result in the slipping of the vehicle wheels. If, however, due to abnormally or unusually poor adhesion between the wheels and the rails, a vehicle wheel should begin to slip during an application of the brakes, a further operation of the equipment occurs which will now be described.

Let it be assumed that during an application of the brakes, the wheels on the trailing axle of the front wheel truck 11 begin to slip. The relay 43 in the circuit of the generator 35 associated with such axle is accordingly picked-up due to the wheel decelerating at a rate in excess of the value sufficient to cause pick-up of the relay. When the relay 43 is picked-up, the contact member thereof is actuated to closed position and thereby establishes a circuit for energizing the operating coils of the relays 45 and 46 for the front wheel truck. This circuit extends from the positive terminal of the battery 71 by way of wire 72, a branch wire 95 including a switch 96, such as the knife switch shown, and the pressure switch 26, a wire 97, the contact member of the relay 43 for the trailing axle of the front wheel truck 11, wires 98 and 99 to a wire 101, and then through two parallel branch circuits. The one branch circuit extends from the wire 101 through the operating coil of the relay 45, a wire 102, pressure switch 33, a wire 103, the magnet winding of the sanding magnet valve 32, a wire 104, and wire 76 back to the negative terminal of the battery 71.

The other branch circuit extends from the wire 101 through the operating coil of the relay 46, a wire 106, pressure switch 27, a wire 107, the magnet winding of the magnet valve device 65 for the valve mechanism 25 corresponding to the front wheel truck 11, a wire 108, and wires 104 and 76 back to the negative terminal of the battery 71.

The contact members of the two relays 45 and 46 are actuated to closed position in response to energization of the relays to establish self-holding circuits for their respective relays. It will be apparent that such is the case because the contact members of the relays 45 and 46 are effective, when in closed position, to establish a connection between the wire 95 and the wire 101 in parallel relation to the contact members of the corresponding current responsive relays 43. Thus, once the relays 45 and 46 are picked-up, they remain picked-up thereafter until the holding circuit therefor is interrupted in the manner subsequently to be described, independently of the condition of the relay 43.

Upon energization of the magnet winding of the sanding magnet valve 32, fluid under pressure is accordingly supplied from the sanding reservoir 31 to the sanding devices 29f for the front wheel truck 11. Since the solenoid operated valve 29a is open and the solenoid operated valve 29b is closed, as previously assumed, it will be apparent that fluid under pressure is supplied to the sanding devices 29f only and not to the sanding devices 29r. Thus sand is deposited only in advance of the car wheels 13 while the car travels in a forward direction.

Upon energization of the magnet winding of the magnet valve device 65 of the valve mechanism 25, the supply of fluid under pressure from pipe 64 to the operating piston of relay valve portion 61 is cut off and fluid under pressure is vented therefrom at a rapid rate. The relay valve portion is accordingly operated to effect a corresponding rapid reduction of the pressure in the brake cylinders 16 for the front wheel truck 11.

The sanding operation and the automatic release of the brakes, it will be observed, occurs only on the wheel truck having a slipping wheel. Thus, if no wheels on the rear wheel truck 12 slip, the automatic sanding and brake release does not occur on the rear wheel truck. If one or more wheels on the rear wheel truck slip, the automatic sanding and brake release is effected in a manner similar to that described for the front wheel truck.

The sanding operation and the reduction of the pressure in the brake cylinder continue until such time as the pressure switches 33 and 27 respectively are operated to open position. The rate of reduction of the pressure in the sanding reservoir 31 by exhaust of fluid under pressure therefrom through the sanding devices 29f is so controlled that the pressure acting to maintain the pressure switch 33 closed does not reduce sufficiently to open the pressure switch 33 until after a certain interval of time, such as ten or fifteen seconds, elapses. The pressure switch 27 associated with the brake cylinders 16 is not operated to open position until the pressure in the brake cylinders reduces below a certain low pressure, such as ten pounds per square inch, which is sufficiently low to insure the cessation of deceleration of the slipping wheel and the acceleration thereof back to a speed corresponding to vehicle speed.

When the slipping wheel ceases to decelerate because of the reduced brake cylinder pressure and begins to accelerate back toward a speed corresponding to vehicle speed, the rate of acceleration of the vehicle wheel is such as to cause the corresponding current-responsive relay 43 to be picked-up after a momentary drop-out thereof during the transition from deceleration to acceleration. As previously stated however, such operation of the current-responsive relay 43 is without effect in view of the holding circuits established by the relays 45 and 46. Furthermore, the time required for the pressure in the brake cylinders of the front wheel truck to reduce sufficiently to open the corresponding pressure switch 27 is of such length that the slipping wheel will have returned previously to a speed corresponding to vehicle speed.

Upon the opening of the pressure switch 33, the holding circuit for the sanding magnet valve 32 is interrupted, thereby deenergizing the magnet valve 32 and the relay 45. The sanding operation is accordingly terminated and the recharging of the sanding reservoir 31 is immediately effected. When the pressure switch 33 recloses in response to the recharging of the sanding reservoir 31 to its normal pressure, the sanding magnet valve 32 is not again energized because the contact member of the relay 45 is in open position. It will be apparent, moreover, that, due to the fact that the slipping wheel or wheels have returned to a speed corresponding to vehicle speed before pressure switch 33 recloses, the current-responsive relay 43 corresponding to the slipping wheel will also be in its dropped-out position and consequently the relay 45 and magnet valve 32 will not be energized again when the pressure switch 33 closes.

Upon the opening of the pressure switch 27, the holding circuit for the relay 46 is interrupted and the magnet winding of the magnet valve device 65 is deenergized. The magnet valve portion 62 of the valve mechanism 25 accordingly becomes effective to cause the resupply of fluid under pressure from the pipe 64 to the operating piston of the relay valve portion 61 of the valve mechanism 25 at a restricted rate. The relay valve portion 61 is accordingly operated to restore the pressure in the brake cylinders 16 of the front wheel truck at a restricted rate.

Due to sanding and due also to the restoration of brake cylinder pressure at a restricted rate, the possibility of repeated slipping of any of the wheels on the same truck is minimized. If, however, any of the wheels on the truck should begin to slip again after the brakes have been reapplied, the corresponding relay 43 is again picked-up and the sanding, brake release, and brake application operation previously described is repeated.

If the wheels on the leading axle of the front wheel truck 11 begin to slip, the voltage at the brush terminals of the corresponding generator 35 and impressed on the voltage-responsive relays 36, 37, and 38 correspondingly reduces. In such case, therefore, the magnet valves 54, 55 and 56 will be correspondingly controlled so as to in some cases reduce the ratio between the pressure established in the pipe 64 leading to the slip-controlled valve mechanism 25 of both wheel trucks and the pressure established in the control pipe 18.

In such cases, therefore, the valve mechanism 25 for the rear wheel truck valve will be operated to correspondingly reduce the pressure in the brake cylinders 16 of the rear wheel truck. However, since the voltage-responsive relays 36, 37, and 38 will be immediately restored to the proper condition thereof corresponding to the speed of the vehicle, when the slipping wheels on the leading axle of the front wheel truck are restored to a speed corresponding to vehicle speed, the valve mechanism 24 will be promptly restored to the condition corresponding to the speed of the vehicle. Thus, in any case, only a momentary reduction of the pressure in the brake cylinders for the wheel truck not having a slipping wheel may occur.

It will be apparent, therefore, that in a train of cars, the brake control equipment on each car is adapted to function as an independent unit in respect to the speed-control and slip-control operation thereof. Thus, the only connection, as far as the control of the brakes is concerned, between successive cars in a train is that established by the usual hose couplings between the sections of the train pipes 17 and 18 on the respective cars.

After a car or train has come to a stop in response to an application of the brakes, and the operator desires to release the brakes prior to again starting the car or train, he merely shifts the brake valve handle 22 back to its normal release position. The pressure in the control pipe 18 is accordingly reduced to atmospheric pressure so that the pressure in the chambers associated with the diaphragms of the speed-controlled valve mechanism 24 is correspondingly reduced to atmospheric pressure. The relay valve portion 51 of the valve mechanism 24 on each car is accordingly operated to exhaust fluid under pressure from the operating piston chambers of the relay valve portion 61 of each valve mechanism 25 on each car so that the pressure in the brake cylinders is correspondingly reduced to atmospheric pressure and the brakes thereby completely released.

If for some reason, such as the failure of the generator 35 associated with the leading axle of the front wheel truck 11, the operator desires to cut the speed-controlled valve mechanism out of normal operation he may do so by simply opening the switch 73, thereby preventing energization of any of the magnet valves 54, 55, and 56 of the speed-controlled valve mechanism 24. In such case, therefore, the pressure established in the brake cylinders will always be one-half the pressure established in the control pipe 18. If switch 73 were not provided, the failure of the generator 35 on the leading axle of the front wheel truck would result in drop-out of all the relays 36, 37 and 38 and thus permit only the lowest ratio of the pressure in the brake cylinder to the pressure in the control pipe. Thus since only one-third of the pressure established in the control pipe 18 could be established in the brake cylinders, the degree of application of the brakes possible would be undesirably low.

If the operator desires, or if it is necessary for some reason, to cut the sanding devices 29f and 29r as well as the magnet valve 65 of the valve mechanisms 25 on a car out of operation, the operator may do so merely by opening the switch 96 thereby preventing the energization of the sanding magnet valve 32 and the magnet valve devices 65 of the valve mechanism 25.

If the car is connected in a train in such a manner as to travel in a reverse direction, or if the car is of the double-end type permitting power control and brake control from opposite ends of the car the apparatus functions in exactly the same manner as for the forward direction of travel. It is necessary, however, in the case of the reverse travel of the car, for the operator to throw the blade of switch 28 to the position opposite to that shown in Fig. 2 so as to effect closing of the solenoid-operated valves 29a in the pipes leading to the sanding devices 29f and at the same time to effect opening of the solenoid-operated valves 29b in the pipes leading to the sanding devices 29r. Thus, when the sanding magnet valves 32 are energized, fluid under pressure is supplied to the sanding devices 29r and not to the sanding devices 29f, so that sand is deposited only in advance of the vehicle wheels for the reverse travel of the car.

It will be apparent that the polarity of the voltage at the brush terminals of the generators 35 is reversed upon reversal of the direction of travel of the car. Thus, upon the starting of the car in the reverse direction, the voltage impressed on the voltage-responsive relays 36, 37, and 38 and the current-responsive relays 43 is reversed. However, since these relays always respond to a voltage or current in excess of a certain predetermined value for each relay, the reversal of polarity in no way changes the operation thereof. It is accordingly deemed unnecessary to further describe the operation of the equipment for the reverse travel of the car.

*Embodiment shown in Fig. 3*

Fig. 3 shows a fragment of the entire apparatus of Fig. 1 including a modified arrangement whereby the voltage responsive relays 36, 37, and 38 pick-up and drop-out at substantially the same speed whether the speed of the car is increasing or decreasing. The remainder of the apparatus, not shown, being the same as in Fig. 1, only those parts and circuits which differ from Fig. 1 will be described. It is to be understood that corresponding parts and circuits in the two figures are designated by the same reference numerals.

In order to cause the voltage-responsive relays 36, 37, and 38 to pick-up and drop-out at substantially the same speed whether the speed of the car is increasing or decreasing, three additional relays 36A, 37A, and 38A are provided. These relays are respectively effective, when the relays 36, 37, and 38 are picked-up to cut a resistor 40 in series relation with the operating coil of the corresponding relay across the wires 29 and 30 leading to and connected across the brush terminals of the generator 35 associated with the leading axle of the front wheel truck 11.

The relays 36A, 37A, and 38A are of the neutral type, each having a contact member a which is shifted from a lower closed position, which it occupies when the relay coil is energized, to an upper closed position when the relay coil is energized.

The operating coil of the relays 36A, 37A, and 38A is in series-circuit relation with the magnet winding of the magnet valve devices 56, 55, and 54, respectively, of the speed-controlled valve mechanism 24, being included respectively in series relation in the wires 74, 78, and 81 leading to the magnet valves of the valve mechanism 24.

It will thus be seen that when the car is stopped or traveling at a speed below 20 M. P. H. so that all of the relays 36, 37, and 38 are dropped out, the coil of the relay 36A is energized whereas the coil of the relays 37A and 38A are deenergized in correspondence with the energization of the low magnet valve 56 and deenergization of the medium magnet valve 55 and high magnet valve 54.

When the speed of the car increases above 20 M. P. H. and the relay 36 is picked-up, the coil of the relay 36A and the magnet winding of the magnet valve 56 are simultaneously deenergized. The contact member $a$ of the relay 36A is effective in its lower or dropped-out position to cut a corresponding resistor 40 in series relation with the coil of the relay 36. The resistor 40 is of such resistance as to reduce the current through the operating coil of the relay 36, at the time it is picked-up or energized, to a value just sufficient to maintain the relay picked-up. It will thus be apparent that such reduction of current by resistor 40 compensates for the reduction of the air gap between the armature and the stationary core of relay 36 so that when the generator voltage impressed on the wires 20 and 30 reduces, due to a decreasing speed of the car, the relay 36 will be dropped-out at substantially the same speed of the car at which it picked-up.

The contact member $a$ of relay 37A is effective in its upper or picked-up position to cut a corresponding resistor 40 in series relation with the operating coil of the relay 37 to perform a similar function for the relay 37.

Contact member $a$ of the relay 38A is effective in its picked-up or upper position to cut a corresponding resistor 40 in series relation with the operating coil of the relay 38 for a similar purpose.

As in the embodiment of Fig. 1, resistors 41 are cut into series relation with the coil of the relays 36 and 37 by the contact members $b$ of the relays 37 and 38, respectively. It should be understood that when both resistors 40 and 41 are cut into series relation with the coil of either of the relays 36 or 37, the impressed voltage is sufficient to maintain the relays picked-up.

It will be noted, however, that when the speed of the car reduces to the drop-out point of the relays 37 and 36, the resistors 41 have already been cut out of the circuit due to the previous drop-out of relays 37 and 38 respectively so that, at such time, only the resistors 40 are in series relation with the coils of the relays.

Since the operation of the embodiment shown in Fig. 3 is the same as that of the embodiment of Fig. 1 except as pointed out above, it is believed unnecessary to further describe the operation of the embodiment shown in Fig. 3.

Figure 4:
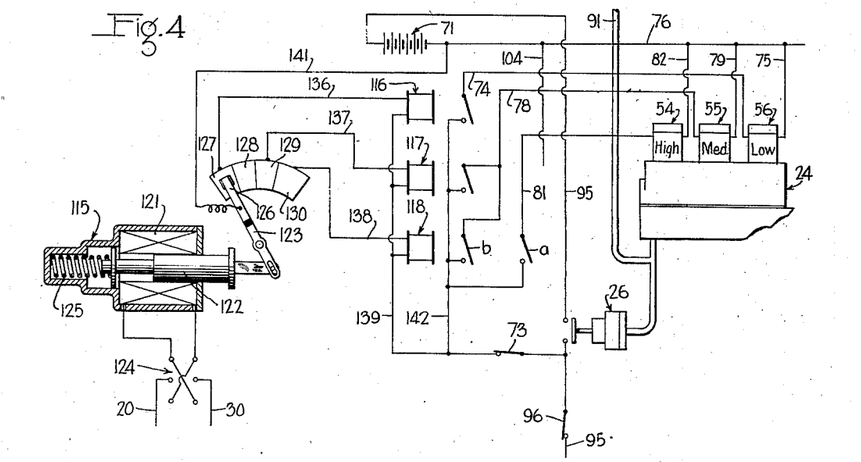
Fig. 4 is a fragmental diagrammatic view, showing another modification of the apparatus of Fig. 1.

*Embodiment shown in Fig. 4*

The embodiment shown in Fig. 4 is the same as that shown in Fig. 1 except that a solenoid-operated selector switch 115, responsive to the voltage across the brush terminals of the generator 35 associated with the leading axle of the front wheel truck 11, and three conventional relays 116 and 117 and 118 of the neutral type are substituted for the relays 36, 37, and 38 of Fig. 1.

In view of the fact that the major portion of the embodiment shown in Fig. 4 duplicates that in Fig. 1, only that portion of the embodiment of Fig. 4 is shown which makes clear the different structure and character of operation.

The solenoid-operated selector switch 115 comprises, as shown in diagrammatically in Fig. 4, a tubular casing in which is contained a solenoid winding 121 for operating a plunger 122 of magnetic material. The plunger 122 is pivotally connected to one end of a pivoted switch arm 123 and pivotally shifts the arm 123 to different positions in accordance with the movement and position of the plunger.

The solenoid winding 121 has its terminals connected, by the wires 20 and 30, across the brush terminals of the generator 35 associated with the leading axle of the front wheel truck 11. A reversing switch 124 is interposed in the wires 20 and 30 in such a manner as to enable the operator to reverse the connections of the winding 121 upon a reversal of direction of travel of the car to insure unidirectional flow of current through the solenoid winding notwithstanding a reversal of direction of travel of the car.

The solenoid winding 121 is effective to set up a magnetic field which urges the plunger 122 in the left-hand direction against the opposing force of a coil spring 125. The amount of movement of the plunger 122 from its normal right-hand position shown is substantially proportional to the degree of energization of the solenoid winding which is in turn proportional to the voltage impressed on the winding by the generator 35.

It will thus be seen that the switch arm 123 is pivotally rocked into different positions in accordance with the speed of travel of the car.

The switch arm 123 has in insulated relation thereon a contact tip 126 which is adapted to engage in wiping contact four contact segments 127, 128, 129, and 130. These contact segments are of such width in relation to the arcuate or pivotal movement of the contact tip 126 that the contact tip 126 remains in engagement with the contact segments only over certain ranges of speed. As long as the car is stopped or does not exceed a speed such as, for example, 20 M. P. H., the contact tip engages only the contact segment 127. When the speed of the car exceeds 20 M. P. H., the contact tip 126 runs off the contact segment 127 and engages contact segment 128. As long as the speed of the car remains above 20 M. P. H., and below a certain higher speed such as 40 M. P. H., the contact tip 126 engages only the contact segment 128.

When the speed of the car exceeds 40 M. P. H., the contact tip 126 runs off segment 128 and engages the contact segment 129. As the speed of travel of the car increases above 40 M. P. H., the contact tip 126 moves over the face of the contact segment 129 toward the contact segment 130. When the speed of the car exceeds 65 M. P. H., the contact tip 126 engages the contact segment 130. As the speed of the car increases above 65 M. P. H., the contact tip 126 shifts so as to completely disengage the contact segment 129 and engage only the contact segment 130.

One corresponding terminal of the operating coil of the several relays 116, 117, and 118 is connected by wires 136, 137, and 138 to the contact segments 127, 129, and 130, respectively, of the solenoid-operated selector switch 115. The opposite terminals of the operating coils of the relays 116, 117 and 118 are connected to a common wire 139 which is a branch of the wire 95 connected to the positive terminal of the battery 71. The pressure-operated switch 26 is interposed in the wire 95 between the point of connection of the wire 139 and the positive terminal of the battery 71.

Switch 73 is interposed in the wire 139 between the point of connection of the wire 139 to the wire 95 and the terminals of the operating coil of the relays 116, 117, and 118. The switch 96 is interposed in the wire 95 for a purpose similar to that in Fig. 1 but on the opposite side of the pressure switch 26.

The contact tip 126 on the switch arm 123 of the solenoid-operated selector switch 115 is connected to the negative terminal of battery 71 by wire 76 and a wire 141 including a flexible portion that does not interfere with the free movement of the switch arm.

It will accordingly be seen that with the pressure switch 26 in its closed position corresponding to application of the brakes and with the switch 73 in closed position, the solenoid-operated selector switch 115 is effective to selectively complete circuits for energizing the operating coils of the relays 116, 117, and 118 depending upon the engagement of the contact tip 126 with the corresponding contact segment 127, 129 or 130 respectively.

Each of the two relays 116 and 117 has a single front-contact member which is actuated to closed position from an open position upon energization of the relay coil. The relay 118, however, has two front-contact members designated a and b respectively.

The contact members of the relays 116 and 117 and the contact member a of the relay 118 are effective in their closed positions to connect the terminal wires 74, 78 and 81 of the low magnet valve 56, the medium magnet valve 55, and the high magnet valve 54, respectively, of the speed-controlled valve mechanism 24 to a branch wire 142 of the wire 139. The wire 142 is connected to the wire 139 at a point between the switch 73 and the operating coils of the relays 116, 117, and 118.

The contact member b of the relay 118 is effective in its closed position to connect the wire 142 to the terminal wire 78 of the medium magnet valve 55. Thus, when the contact tip 126 engages only the contact segment 130, as it does at vehicle speeds above 65 M. P. H., the energizing circuit of the magnet winding of the medium magnet valve piston 55 remains closed through the closed contact member b of the relay 118, although relay 117 is dropped-out.

Thus it will be seen that the same cycle of energization of the magnet valves 56, 55, and 54 of the speed-controlled valve mechanism 24 is effected upon increasing and decreasing speeds as in the embodiment shown in Fig. 1.

In the embodiment shown in Fig. 4, the switch 73 is effective, when opened, to prevent the energization of the operating coils of the relays 116, 117, and 118 as well as the energization of the magnet windings of the magnet valves 54, 55, and 56 of the speed-controlled valve mechanism 24. Thus the switch 73 functions, as in Fig. 1, to condition the speed-controlled valve mechanism 24 so as to establish a pressure in the brake cylinders which is one-half the pressure established in the control pipe in the event of failure of the generator 35 to energize the solenoid winding 121 of the solenoid-operated selector switch 115.

By arranging the switch 96 in the manner indicated in Fig. 4, the operation of the sanding magnet valve 32 and of the magnet valve device 65 of the slip-controlled valve mechanisms 25 may be prevented, upon opening of switch 96, without interfering with the control of the magnet valves of the speed-controlled valve mechanism 24 by the solenoid-operated selector switch 115.

The operation of the present embodiment as a whole should be apparent from the description given in connection with Fig. 1 and the partial description of the present embodiment just given. It is deemed unnecessary, therefore, to further describe the operation of this embodiment.

Figure 5:
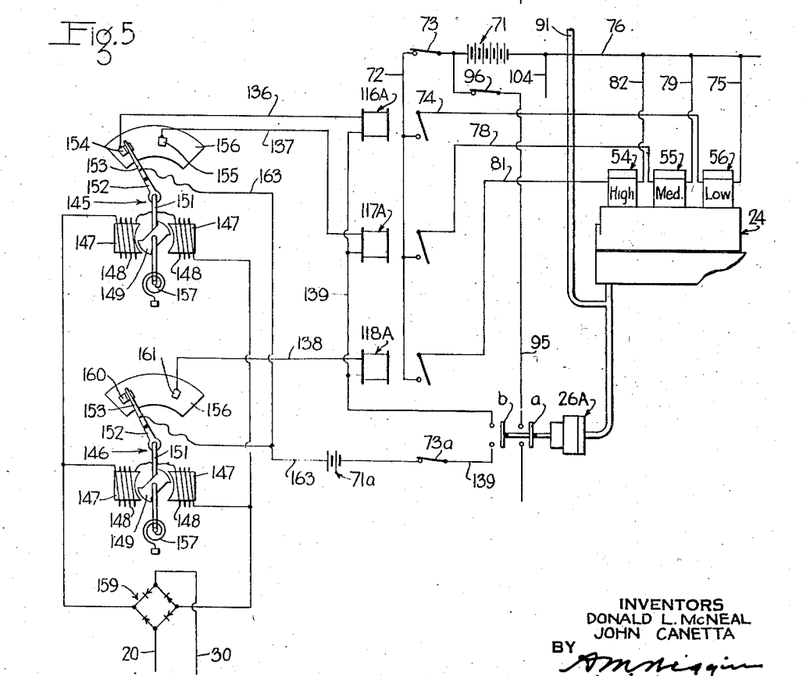
Fig. 5 is a fragmental diagrammatic view, showing a further modification of the apparatus of Fig. 1.

*Embodiment shown in Fig. 5*

The embodiment shown in Fig. 5 is the same as that in Fig. 1 except, as shown fragmentally, two so-called "torque relays" 145 and 146 and three neutral type relays 116A, 117A, and 118A are provided in place of the voltage-responsive relays 36, 37, and 38 of Fig. 1.

As shown diagrammatically in Fig. 5, the torque relay 145 comprises a pair of stationary pole pieces 147 on each of which is a field winding 148, and a rotor having a bi-polar element 149 of magnetic material which is carried on a rotary spindle 151 mounted in suitable journal bearings not shown. Fixed to the spindle 151 is a contact arm 152 having an outer insulated contact tip 153 for selectively engaging either of two stationary spaced contact members 153 and 154 carried in insulated relation on a stationary base 156. The spindle 151 is biased rotarily by a torsion spring 157 to a normal position in which the contact tip 153 engages the contact member 154.

The two field windings 148 are connected in series relation to each other across the output terminals of a full-wave rectifier 159, illustrated as of the copper-oxide disk type. The input terminals of the rectifier 159 are connected by the wires 20 and 30 respectively across the brush terminals of the generator 35 associated with the leading axle of the front wheel truck 11. The arrangement of the field windings 148 is such as to produce opposite magnetic poles at the gap between the pole pieces 147 so that the magnetic flux flows across the gap between the pole pieces 147.

The torque relay 146 is similar to the relay 145 but differs therefrom in that the contact arm 152 thereof moves through a wider arc than does the contact arm of relay 145, between a stop 160, defining the normal position, and a contact member 161. The field windings 148 of the relay 146 are connected in series relation to each other across the output terminals of the rectifier 159 in parallel relation to the field windings of the relay 145. Like windings 148 of relay 145, they produce opposite magnetic poles at the gap between the pole pieces 147.

The arrangement of the contact arm 152 and the associated contact members 154 and 155 or 161 of the torque relays is such that as long as the car is stopped or travels at a speed less than 20 M. P. H., the voltage impressed on the field windings of the torque relays is ineffective to cause rotary movement of the spindles 151 and consequently shifting of the contact arms 152 out of their normal positions.

When the speed of the car increases above 20 M. P. H., the generator voltage impressed on the field windings of the torque relays is such as to initiate a rotary movement of the spindles 151 causing displacement of the contact arms 152 in a clockwise direction out of their normal positions shown an amount varying with the voltage impressed on the field windings 148.

When the speed of the car exceeds 40 M. P. H., the corresponding rotary movement of the contact arm 152 of the torque relay 145 is such as to effect engagement of the contact tip 153 thereof with the contact member 155. As the speed of the car increases further above 40 M. P. H., further movement of the contact arm 152 of the torque relay 145 is prevented, the contact tip 153 on the arm 152 being however more firmly pressed into contact with the contact member 155.

As the speed of the car continues to increase above 40 M. P. H., the contact arm 152 of the torque relay 146 continues to move toward the contact member 161 and, when the car exceeds a speed such as 65 M. P. H., the contact tip 153 on the arm 152 engages the contact member 161. As the speed of the car continues to increase above 65 M. P. H., further movement of the contact arm is prevented although the contact tip is more firmly pressed into engagement with the contact member.

Conversely, when the speed of the car reduces below 65 M. P. H., the contact tip on the arm 152 of the torque relay 146 disengages the contact member 161. Similarly, the contact tip on the arm 152 of the torque relay 145 disengages the contact member 155 when the speed of the car decreases below 40 M. P. H. When the speed of the car reduces below 20 M. P. H., the contact tip 153 on the arm 152 of each relay reengages the contact member 154 or stop 160 and remains in engagement therewith as the speed of the car reduces thereafter to zero speed.

The construction of the torque relays 145 and 146 is such as to require flow of current through the field coils 148 thereof in one direction only in order to effect the operational movement of the contact arms 152 out of the normal position thereof upon the increase of voltage impressed thereon. Rectifier 159 is accordingly provided in order to insure the proper direction of flow of current through the field coils 148 of the torque relays regardless of the direction of travel of the car and, consequently, of the polarity of the brush terminals of the generator 35 supplying voltage to energize the field coils. If desired, a reversing switch, such as the reversing switch 124 employed in the embodiment shown in Fig. 4, may be provided in place of the rectifier 159. The rectifier 159 is inherently automatic in character whereas the reversing switch requires manual operation or some other automatic operating means not a part of this invention.

One corresponding terminal of the operating coil of each of the relays 116A, 117A and 118A is connected by the wires 136, 137 and 138 to the contact members 154, 155 and 161, respectively, of the torque relays. The remaining terminals of the operating coils of these relays are connected by a common wire 139 to the negative terminal of an auxiliary battery 71a. The contact tip 153 on the contact arms 152 of each of the torque relays 145 and 146 is connected by a wire 163 to the positive terminal of the battery 71a.

A pressure switch 26A is provided in Fig. 5 which differs from the pressure switch 26 of previous embodiments in that it has two insulated contact members a and b instead of but one contact member. The contact member a correponds to the single contact member of the pressure switch 26 and controls the circuit through the wire 95 in the same manner as in previous embodiments. The contact member b of the pressure switch 26A controls the circuit through the wire 139 so as to interrupt the energizing circuit for the coils of the relays 116A, 117A and 118A, subsequently to be described, unless the control pipe 18 is charged to a sufficient pressure.

An auxiliary switch 73a, indicated as of the knife type, is also included in the wire 139 so that when opened it prevents energization of the coils of the relays 116A, 117A and 118A independently of the pressure switch 26A.

In operation, it will be apparent that with the contact tip 153 on the contact arm 152 of the torque relay 145 engaging the contact member 154, with the contact member b of the pressure switch 26A in closed position, and with the switch 73a in closed position, a circuit is completed for energizing the operating coil of the relay 116A. In a similar manner, with the contact tip 153 on the arm 152 of the torque relay 145 engaging the contact member 155 a circuit is completed for energizing the operating coil of the relay 117A. Similarly, with the contact tip 153 on the arm 152 of the torque relay 146 engaging the contact member 161, a circuit is completed for energizing the operating coil of the relay 118A.

The auxiliary battery 71a is of relatively low voltage compared to the battery 71 so that the current in the energizing circuit of the relays 116A, 117A and 118A interrupted by disengagement of the contact tips on the arms 152 of the torque relays from the associated contact members 154, 155 or 161 is not such as to cause excessive burning or pitting of the contact members and of the contact tips which might occur if the full voltage of the battery 71 were employed. Obviously, the coils of the relays 116A, 117A and 118A are suitably designed so as to pick-up the single contact members thereof upon the completion of the energizing circuit therefor.

The contact members of the relays 116A, 117A and 118A are arranged to control the energizing circuits of the magnet valves 56, 55 and 54 respectively of the speed-controlled valve mechanism 24 in a manner similar to that of the contact members of the relays 116, 117 and 118 of the embodiment shown in Fig. 4. It will be noted, however, that since the contact tip 153 of the torque relay 145 remains in engagement with the contact member 155 as long as the speed of the car exceeds 40 M. P. H., it is unnecessary to provide the relay 118A with an additional contact member corresponding to the contact member b of the relay 118.

It will be apparent that the magnet valves 54, 55 and 56 of the speed-controlled valve mechanism 24 are thus selectively energized or deenergized in different combinations depending upon the speed of the car or train in exactly the same manner as in the previous embodiments. It will also be apparent that the pressure switch 26A of the embodiment shown in Fig. 5 prevents energization of the relays 116A, 117A and 118A and of the magnet valves of the speed-controlled valve mechanism 24 until an application of the brakes is initiated, thus preventing undesired drainage of current from the batteries 71 and 71a.

Taken together with the description of the operation of the embodiment shown in Fig. 1, it believed that the above description sufficiently describes the operation of the embodiment shown in Fig. 5 and accordingly no further description is believed necessary.

*Summary*

Summarizing, it will be seen that we have disclosed a plurality of embodiments of a brake and sanding control equipment whereby the degree of application of the brakes is automatically reduced as the speed of a car or train reduces and whereby, upon slipping of an individual wheel or pair of wheels during application of the brakes, the brakes associated with the wheel truck having the slipping wheels are automatically rapidly released and sanding of the rails effected to prevent sliding of these wheels.

In all embodiments, each axle is provided with a direct-current generator driven at a corresponding speed and supplying a voltage corresponding to the speed of rotation of the individual axle and wheels fixed thereto. In all embodiments, electrical apparatus responsive to the rate of reduction of the corresponding generator voltage is effective to initiate a sanding operation and the rapid release of the brakes to prevent sliding of the wheels.

In all of the embodiments, the voltage of one of the axle-driven generators is adapted to control various types of apparatus for causing a reduction in the degree of application of the brakes as the speed of the car or train reduces.

In the first embodiment, a plurality of voltage-responsive relays respectively operative at different critical voltages corresponding to different vehicle speeds is employed to control the degree of application of the brakes and effect a reduction in the degree of application automatically as the speed of the car reduces.

A second embodiment discloses a modification of the first embodiment for insuring pick-up and drop-out of the voltage-responsive relays at substantially the same speed regardless of whether the speed is increasing or decreasing.

A third embodiment discloses a solenoid-operated selector switch controlled responsively according to the voltage of one of the axle-driven generators for controlling the degree of application of the brakes and effecting a reduction therein automatically as the speed of the car reduces.

Another embodiment discloses an arrangement including so-called torque relays operatively responsive according to the voltage of one of the axle-driven generators for controlling the degree of application of the brakes and the automatic reduction in the degree of application as the speed of the car reduces.

While we have shown and described only several embodiments of our invention, it will be apparent that various omissions, additions, or modifications may be made in the embodiments shown without departing from the spirit of our invention. It is accordingly not our intention to limit the scope of our invention except as it is necessitated by the scope of the prior art.

Having now described our invention, what we claim as new and desire to secure by Letters Patent, is:

1. Brake control apparatus for a wheeled vehicle comprising, in combination, means for causing application and release of the brakes associated with the wheels of the vehicle, means for producing an electrical effect substantially proportional in degree to the speed of rotation of a vehicle wheel, means controlled according to the degree of electrical effect supplied by said producing means for controlling the degree of application of the brakes on said wheel, and means controlled according to the rate of change in the degree of electrical effect supplied by said producing means for also controlling the degree of application of the brakes on said wheel.

2. Brake control apparatus for a wheeled vehicle comprising, in combination, means for causing application and release of the brakes associated with the wheels of the vehicle, means for producing a voltage substantially proportional to the speed of rotation of a vehicle wheel, means controlled according to the voltage supplied by said producing means for controlling the degree of application of the brakes on said wheel, and means controlled according to the rate of change of voltage supplied by said producing means for also controlling the degree of application of the brakes on said wheel.

3. Brake control apparatus for a wheeled vehicle comprising, in combination, means for causing application and release of the brakes associated with the wheels of the vehicle, means for producing an electrical effect substantially proportional in degree to the speed of rotation of a vehicle wheel, means controlled according to the degree of electrical effect supplied by said producing means and effective during an application of the brakes for automatically reducing the degree of application of the brakes on all the braked wheels of the vehicle as the speed of rotation of the vehicle wheel reduces, and means operative in response to a reduction in the degree of electrical effect supplied by said producing means at a rate exceeding a certain rate for causing a rapid reduction in the degree of application of the brakes on only certain of the braked wheels and including said one wheel.

4. Brake control apparatus for a wheeled vehicle comprising, in combination, means for causing application and release of the brakes associated with the wheels of the vehicle, means for producing a voltage substantially proportional to the speed of rotation of a vehicle wheel, means controlled according to the voltage supplied by said producing means for effecting reduction in the degree of application of the brakes associated with all the braked wheels of the vehicle as the speed of rotation of said wheel reduces, and means operative in response to a reduction of the voltage supplied by said producing means at a rate in excess of a certain rate occurring when the said wheel slips for effecting a rapid reduction in the degree of application of the brakes associated with only certain of the braked wheels including said one wheel.

5. Brake control apparatus for a vehicle having a plurality of separately rotatable wheels comprising, in combination, means for effecting application and release of the brakes associated with all of said wheels, individual means associated with each of said wheels respectively for producing an electrical effect substantially proportional in degree to the speed of rotation of the corresponding wheel, means controlled according to the degree of electrical effect supplied by one of said producing means for controlling the degree of application of the brakes on all of said wheels, means responsive to a change in the electrical effect supplied by any one of certain ones of said producing means at a rate exceeding a certain rate for controlling the degree of application of the brakes associated with the corresponding wheels, and additional means responsive to a change in the electrical effect supplied by any one of other certain ones of said producing means at a rate exceeding said certain rate for controlling the degree of application of the brakes on the corresponding wheels.

6. Brake control apparatus for a wheeled vehicle comprising, in combination, a normally uncharged control pipe chargeable with fluid at different pressures, a variably conditionable relay valve mechanism adapted to supply fluid at a pressure having any one of a plurality of different ratios to the pressure established in said pipe depending upon the condition thereof for effecting a corresponding degree of application of the brakes, means for producing a voltage substantially proportional to the speed of rotation of a vehicle wheel, voltage-responsive means effective according to the voltage supplied by said producing means for varying the condition of said relay valve mechanism upon changes in the speed of rotation of said wheel, whereby to cause a variation of the pressure supplied by said relay valve mechanism and the consequent variation in the degree of application of the brakes, means operative in response to a change in the voltage supplied by said producing means at a rate exceeding a certain rate, and means controlled by the last said means for effecting a rapid reduction in the degree of the application of the brakes associated with said wheel.

7. Brake control apparatus for a wheeled vehicle comprising, in combination, a brake cylinder operative to cause application and release of the brakes associated with a vehicle wheel in accordance with the pressure of the fluid supplied thereto, a relay valve device operative to cause the establishment of pressure in said brake cylinder in accordance with the pressure of an operating fluid supplied to said relay valve device, means controlled according to the rotative speed of the said vehicle wheel effective during an application of the brakes for effecting repeated reductions of limited duration in the pressure of the fluid supplied to said relay valve device as the speed of rotation of the vehicle wheel diminishes, and means effective only when the vehicle wheel decelerates at a rate exceeding a certain rate for effecting a single rapid reduction of the operating pressure supplied to said relay valve device to below a certain pressure to effect a corresponding rapid reduction of the pressure in the brake cylinder.

8. Brake control apparatus for a wheeled vehicle comprising, in combination, a brake cylinder operative to cause application and release of the brakes associated with a vehicle wheel in accordance with the pressure of the fluid supplied thereto, a relay valve device operative to cause the establishment of pressure in said brake cylinder in accordance with the pressure of an operating fluid supplied to said relay valve device, means controlled according to the rotative speed of the said vehicle wheel effective during an application of the brakes for effecting repeated reductions of limited duration in the pressure of the fluid supplied to said relay valve device as the speed of rotation of the vehicle wheel diminishes, means effective only when the vehicle wheel decelerates at a rate exceeding a certain rate for effecting a single rapid reduction of the operating pressure supplied to said relay valve device to below a certain pressure to effect a corresponding rapid reduction of the pressure in the brake cylinder, and means effective when the pressure in the brake cylinder reduces below said certain pressure for causing the last said means to terminate the reduction of the operating pressure for the said relay valve device and initiate a resupply of fluid thereto at a pressure controlled by said speed-controlled means.

9. Brake apparatus for a wheeled vehicle comprising, in combination, brake means associated with a wheel of the vehicle, means including a plurality of electroresponsive means adapted to be selectively energized or deenergized in different combinations, said means being effective to cause application of the brake means with different degrees of force depending upon the combination of the electro-responsive means in effect, means for supplying a voltage substantially proportional to the speed of rotation of the said wheel, and means responsive to the voltage delivered by said voltage-supply means for selectively controlling energization and deenergization of the said plurality of electroresponsive means so as to vary the combination in effect and thereby vary the degree of application of the brakes as the speed of rotation of said wheel varies.

10. Brake control apparatus for a wheeled vehicle comprising, in combination, a brake cylinder adapted to apply the brakes associated with a vehicle wheel with varying force corresponding to the pressure of the operating fluid supplied thereto, a normally uncharged pipe chargeable with fluid at different pressures, relay valve means including a plurality of electroresponsive means adapted to be energized or deenergized in different selected combinations whereby said relay valve means is effective in response to a given pressure established in said pipe to establish in said brake cylinder any one of a plurality of different pressures dependent upon the combination of the electroresponsive means in effect, means for supplying a voltage substantially proportional to the speed of rotation of the said vehicle wheel, and means operatively responsive to the voltage delivered by said voltage-supply means for selectively controlling energization and deenergization of the electroresponsive means of said relay valve means so as to vary the combination in effect whereby said relay valve means is operated to vary the pressure in the brake cylinder automatically without any change in the pressure in said pipe as the speed of the said vehicle wheel varies.

11. Brake control apparatus for a wheeled vehicle comprising, in combination, brake means associated with a wheel of the vehicle, means including a plurality of electroresponsive means adapted to be energized and deenergized in different selected combinations whereby said means causes application of the brake means with any one of a plurality of different degrees of force dependent upon the combination of the electroresponsive means in effect, means for supplying a voltage substantially proportional to the speed of rotation of the vehicle wheel, a plurality of voltage-responsive relays on which the voltage delivered by said voltage-supply means is impressed, one of said voltage-responsive relays being operatively responsive only to a voltage in excess of a certain value, a second one of said relays being operatively responsive only to a voltage in excess of a second certain value higher than the first said certain value, and a third one of said relays being operatively responsive only to a voltage in excess of a third certain value higher than said second voltage, each of said relays being effective to control energization and deenergization of a corresponding one of said plurality of electroresponsive means whereby to automatically vary the combination of electroresponsive means in effect in accordance with the speed of rotation of the said wheel.

12. Brake control apparatus for a wheeled vehicle comprising, in combination, brake means associated with a wheel of the vehicle, means including a plurality of electroresponsive means adapted to be energized and deenergized in different selected combinations whereby said means causes application of the brake means with any one of a plurality of different degrees of force dependent upon the combination of the electroresponsive means in effect, means for supplying a voltage substantially proportional to the speed of rotation of the vehicle wheel, a plurality of voltage-responsive relays on which the voltage delivered by said voltage-supply means is impressed, one of said voltage-responsive relays being operatively responsive only to a voltage in excess of a certain value, a second one of said relays being operatively responsive only to a voltage in excess of a second certain value higher than the first said certain value, a third one of said relays being operatively responsive only to a voltage in excess of a third certain value higher than said second voltage, each of said relays being effective to control energization and deenergization of a corresponding one of said plurality of electroresponsive means whereby to automatically vary the combination of electroresponsive means in effect in accordance with the speed of rotation of the said wheel, current-limiting means associated with said one relay, a second current-limiting means associated with said second relay, said second relay being effective to render the first said current-limiting means effective to limit the current through the first said relay when it operatively responds to a voltage in excess of said second certain value, and said third relay being adapted to render said second current-limiting means effective to limit the current through said second relay when said third relay operatively responds to a voltage in excess of said third value.

13. Brake control apparatus for a wheeled vehicle comprising, in combination, brake means associated with a wheel of the vehicle, means including a plurality of electroresponsive means adapted to be energized and deenergized in different selected combinations whereby said means causes application of the brake means with any one of a plurality of different degrees of force dependent upon the combination of the electroresponsive means in effect, means for supplying a voltage substantially proportional to the speed of rotation of the vehicle wheel, a plurality of voltage-responsive relays on which the voltage delivered by said voltage-supply means is impressed, one of said voltage-responsive relays being operatively responsive only to a voltage in excess of a certain value, a second one of said relays being operatively responsive only to a voltage in excess of a second certain value higher than the first said certain value, a third one of said relays being operatively responsive only to a voltage in excess of a third certain value higher than said second voltage, each of said relays being effective to control energization and deenergization of a corresponding one of said plurality of electroresponsive means whereby to automatically vary the combination of electroresponsive means in effect in accordance with the speed of rotation of the said wheel, current-limiting means associated with said one relay, a second current-limiting means associated with said second relay, said second relay being effective to render the first said current-limiting means effective to limit the current through the first said relay when it operatively responds to a voltage in excess of said second certain value, said third relay being adapted to render said second current-limiting means effective to limit the current through said second relay when said third relay operatively responds to a voltage in excess of said third value, and means effective upon the operative response of each of said relays to an increasing voltage for rendering said one, said second, and said third relays thereafter operatively responsive to a reducing voltage at values corresponding substantially to said first certain, said second certain, and said third certain voltages, respectively.

14. Brake control apparatus for a wheeled vehicle comprising, in combination, brake means for a wheel of the vehicle, means including a plurality of electroresponsive means adapted to be energized and deenergized in different selected combinations to cause said means to effect application of the brake means with different degrees of force depending upon the combination of electroresponsive means in effect, means for supplying a voltage proportional to the speed of rotation of the said vehicle wheel, a plurality of voltage-responsive relays corresponding in number to the number of the electroresponsive means, said voltage-responsive relays being operatively responsive in succession to different successively higher voltages as the voltage impressed thereon increases and effective respectively to control energization and deenergization of a corresponding one of said electroresponsive means, and means effective upon the operative response of said voltage-responsive relays to cause a reduction of the voltage impressed on the preceding relay whereby to prevent the imposition of excessive voltage on said relay.

15. Brake control apparatus for a wheeled vehicle comprising, in combination, brake means for a wheel of the vehicle, means including a plurality of electroresponsive means adapted to be energized and deenergized in different selected combinations to cause said means to effect application of the brake means with different degrees of force depending upon the combination of electroresponsive means in effect, means for supplying a voltage proportional to the speed of rotation of the said vehicle wheel, a plurality of voltage-responsive relays corresponding in number to the number of the electroresponsive means, said voltage-responsive relays being operatively responsive in succession to different successively higher voltages as the voltage impressed thereon increases and effective respectively to control energization and deenergization of a corresponding one of said electroresponsive means, and means effective upon the operative response of each of said relays to an increasing voltage for rendering said relay operatively responsive to substantially the same voltage when the voltage impressed thereon decreases.

16. Brake control apparatus for a wheeled vehicle comprising, in combination, brake means for a wheel of the vehicle, means including a plurality of electroresponsive means adapted to be energized or deenergized in different selected combinations to cause said means to effect application of the brakes with different degrees of force corresponding to the combination of electroresponsive means in effect, means for supplying a voltage substantially proportional to the speed of rotation of the said vehicle wheel, and a selector switch having a solenoid winding which is energized in varying degree according to the voltage delivered by said voltage supply means, and a switch element which is operated to a plurality of different positions depending upon the degree of energization of said solenoid winding, the switch element of the said selector switch being effective in its different positions to selectively control energization and deenergization of the said plurality of electroresponsive means whereby the degree of application of the brake means is varied upon variations in the speed of the vehicle wheel.

17. Brake control apparatus for a wheeled vehicle comprising, in combination, brake means for a wheel of the vehicle, means including a plurality of electroresponsive means adapted to be energized or deenergized in different selected combinations to cause said means to effect application of said brake means with different degrees of force depending upon the combination of the electroresponsive means in effect, means for supplying a direct-current voltage substantially proportional to the speed of rotation of the vehicle wheel and of opposite polarity depending upon the direction of rotation of said wheel, a selector switch having a solenoid winding, and a switch which is operated to any one of a plurality of different positions corresponding to the degree of energization of said solenoid winding, a reversing switch controlling the imposition of the voltage delivered by said voltage-supply means on said solenoid means in a manner to cause the polarity of the voltage impressed on the solenoid winding to be the same for opposite directions of rotation of said wheel, the switch element on said selector switch being effective in its different positions to selectively energize or deenergize the plurality of electroresponsive means in different combinations whereby the said brake control means effects application of the brake means to different degrees depending upon the rotative speed of the vehicle wheel.

18. Brake control apparatus for a wheeled vehicle comprising, in combination, brake means for a wheel of the vehicle, means including a plurality of electroresponsive means adapted to be energized or deenergized in different selected combinations to cause said means to effect application of the brake means with different degrees of force depending upon the combination of the electroresponsive means in effect, means for supplying a voltage substantially proportional to the speed of rotation of the vehicle wheel, and a pair of voltage-responsive relays, each of said relays having a winding on which the voltage delivered by the voltage supply means is impressed and a switch arm which is shiftable rotarily to different positions in accordance with the degree of the voltage impressed on the windings, the switch arm of one of said relays being effective in accordance with the poistion thereof to selectively control the energization and deenergization of two of said electroresponsive means and the switch arm of the other of said relays being effective in accordance with the position thereof to control energization and deenergization of another of said electroresponsive means.

19. Brake control apparatus for a wheeled vehicle comprising, in combination, brake means for a wheel of the vehicle, means including a plurality of electroresponsive means adapted to be energized or deenergized in different selected combinations to cause said means to effect application of the brake means with different degrees of force depending upon the combination of the electroresponsive means in effect, means for supplying a voltage substantially proportional to the speed of rotation of the vehicle wheel, a pair of voltage-responsive relays, each of said relays having a winding on which the voltage delivered by the voltage supply means is impressed and a switch arm which is shiftable rotarily to different positions in accordance with the degree of the voltage impressed on the windings, the switch arm of one of said relays being effective in accordance with the poistion thereof to selectively control the energization and deenergization of two of said electroresponsive means and the switch arm of the other of said relays being effective in accordance with the position thereof to control energization and deenergization of another of said electroresponsive means, and a full-wave rectifier having the voltage delivered by said voltage supply means impressed on the input terminals thereof and adapted to have the voltage at the output terminals thereof impressed on the windings of said relays so that the windings of said relays are energized by a voltage of the same polarity notwithstanding a reversal of direction of rotation of the vehicle wheel.

DONALD L. McNEAL.
JOHN CANETTA.